UNITED STATES PATENT OFFICE 2,290,524

VULCANIZING RUBBER

David J. Beaver, Nitro, W. Va., assignor to Monsanto Chemical Company, St. Louis, Mo., a corporation of Delaware No Drawing. Application April 21, 1939,
Serial No. 269,210

10 Claims. (Cl. 260—776)

The present invention relates to new vulcanization accelerators, to a process of vulcanizing rubber and to the vulcanized rubber product obtained with the aid of said new accelerators. The accelerators which comprise the present invention are applicable to the vulcanization of rubber products generally but in the preferred embodiment of the invention are employed in the vulcanization of rubber latex, in which use their properties are particularly desirable.

The unique physical and chemical properties of rubber latex present problems of vulcanization not usually encountered in the vulcanization of crude rubber. For example, it is necessary to employ an accelerator which is relatively stable in the aqueous vehicle of the latex and the proposed accelerator should resist hydrolysis and other effects tending to take place in aqueous media. The latex colloid is sensitive to added ingredients and the addition of an accelerator should not bring about undesirable changes in the unvulcanized latex such as variations in the viscosity and discoloration. Furthermore, in many commercial operations employing latex as well as in certain operations involving crude rubber it is desired to obtain a good fast cure in a very short time.

It is an object of this invention to provide an improved rubber product, and more particularly a class of compounds which when incorporated into rubber exhibit improved accelerating properties. Another object of the invention is to provide a class of compounds which, when incorporated into rubber latex, exhibit improved accelerating properties. Another object is to provide a class of accelerators which, when incorporated into an aqueous rubber dispersion, exhibit desirable stability therein.

A further object of the invention is to provide a class of accelerators which when incorporated into a vulcanizable latex, have substantially no deleterious effect on the physical or chemical properties of the said vulcanizable latex as evidenced by an absence of appreciable discoloration, variations in viscosity and other undesirable effects.

A still further object is to provide a class of accelerators which, when incorporated into a vulcanizable latex, produce a cured rubber product of improved properties.

The above and other objects hereinafter shown are achieved by the use of a class of new and improved accelerators which comprise tertiary cyclohexylamine salts of dithiocarbamates and preferably tertiary cyclohexylamine salts of dithiocarbamates derived from secondary amines.

The preferred class of compounds are illustrated by the following structural formula:

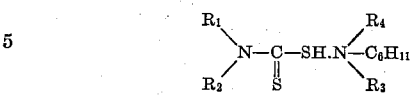

wherein $R_1$ represents a hydrocarbon radical which may be linked to $R_2$ to form a ring configuration, $R_2$ likewise representing a hydrocarbon radical such as for example an alkyl, aralkyl, aryl or alicyclic hydrocarbon group. $R_3$ and $R_4$ are hydrocarbon groups.

It has been found that the use of tertiary cyclohexylamine salts of dithiocarbamates for the vulcanization of rubber represents an improvement over the prior art and more particularly an improvement over the use of primary and secondary amine salts of dithiocarbamates. One illustration of this improvement is the exceptionally strong accelerating action exhibited by tertiary cyclohexylamine salts. This desirable feature is accompanied by an increased speed of vulcanization and a lower critical temperature as compared to the corresponding primary and secondary amine salts. In addition the tertiary cyclohexylamine salts give a relatively flat curing curve or in other words the modulus and tensile properties of the vulcanized rubber products are substantially constant over a range of cures. This latter is a particularly desirable property and it is evident from this in conjunction with the other desirable features herein disclosed that the preferred class of accelerators constitute a class of ideal ultra accelerators.

In general the new and improved accelerators may be prepared by the methods which have been described for the preparation of mixed dithiocarbamates as for example by reacting carbon bisulfide with a mixture comprising substantially equi-molecular proportions of a secondary amine and a tertiary cyclohexylamine. Where convenient or desirable carbon bisulfide may be reacted in alkaline solution with an amine capable of forming a dithiocarbamate and the metallic salt of the dithiocarbamate so formed reacted with a mineral acid salt of a teritary cyclohexylamine to produce the desired tertiary amine salt of the dithiocarbamate. As an alternative procedure the free dithiocarbamate may be liberated at a low temperature and subsequently reacted with a tertiary cyclohexylamine. Other methods will suggest themselves to those skilled in the art to which the present invention pertains. The present invention does not relate to the preparation of the new accelerators and it is to be understood that it is not limited thereby. Therefore, the following specific examples which describe the preparation of the new accelerators as well as specific embodiments of their use are to be considered as illustrative of the invention and not a limitation thereof.

EXAMPLE I 38.1 parts by weight (substantially 0.3 molecular proportion) of N,N dimethyl cyclohexylamine and 33 parts by weight (substantially 0.3 molecular proportion) of N-methyl cyclohexylamine were placed in a suitable reactor and from 250 to 300 parts by weight of petroleum ether added. The solution was cooled to 10° C. and to the cold solution, agitated by a suitable stirring mechanism, there was slowly added 22.8 parts by weight (substantially 0.3 molecular proportion) of carbon bisulfide. The reaction mixture was preferably maintained below 15° C. until the completion of the reaction. The reaction product comprising the desired N,N dimethyl cyclohexylamino, N methyl cyclohexyl dithiocarbamate separated in a good yield as a low melting solid, (melting point 65–70° C.). Its desirable accelerating properties are apparent from the following specific embodiments of the invention.

Rubber stocks were compounded comprising

|  | Stock | |
|---|---|---|
|  | A | B |
|  | Parts by weight | Parts by weight |
| Pale crepe rubber | 100 | 100 |
| Zinc oxide | 10 | 10 |
| Sulfur | 2 | 2 |
| Stearic acid | 0.5 | 0.5 |
| N,N dimethyl cyclohexylamino N methyl cyclohexyl dithiocarbamate | 0.375 | 0.3 |
| Di(benzothiazyl thiol) dimethyl urea |  | 1.0 |

The stocks so compounded were vulcanized in a press at the temperature of 5 pounds steam pressure per square inch. The modulus and tensile properties of the cured rubber products are given in the following table.

*Table I*

| Stock | Cure time in minutes | Modulus of elasticity in lbs./in.$^2$ at elongations of— | | Tensile at break in lbs./in.$^2$ | Ult. elong., percent |
|---|---|---|---|---|---|
|  |  | 500% | 700% |  |  |
| A | 15 | 100 | 290 | 1,425 | 1,015 |
| A | 30 | 225 | 1,000 | 2,540 | 885 |
| A | 45 | 275 | 1,310 | 3,250 | 890 |
| A | 60 | 500 | 2,380 | 4,575 | 835 |
| B | 30 | 620 | 2,930 | 4,450 | 800 |
| B | 45 | 985 | 4,175 | 4,900 | 760 |
| B | 60 | 1,290 | 4,950 | 4,950 | 700 |

The above data show the desirable accelerating properties exhibited by the preferred class of materials when incorporated into crude rubber as the sole accelerator and they further show their desirable properties in conjunction with an accelerator of a different class, as for example a thiazole accelerator, as an activator thereof. It is evident that highly desirable modulus and tensile properties are obtainable by the use of the preferred accelerators. In its preferred embodiment, however, the present invention contemplates the use of the improved accelerators in rubber latex. As a specific example of a preferred embodiment of the invention a latex stock was compounded comprising the following ingredients:

|  | Stock C, parts by weight |
|---|---|
| Rubber as 60% latex | 100 |
| Zinc oxide | 1 |
| Sulfur | 1 |
| N,N dimethyl cyclohexylamino N methyl cyclohexyl dithiocarbamate | 0.75 |

The stock so compounded was flowed on glass and the films so formed dried and cured as shown. The modulus and tensile properties obtained on testing the cured rubber products are set forth in the following table:

*Table II*

| Stock | Cure time in minutes | Modulus of elasticity in lbs./in.$^2$ at elongations of— | | Tensile at break in lbs./in.$^2$ | Ult. elong., percent |
|---|---|---|---|---|---|
|  |  | 500% | 700% |  |  |
| CURED IN WATER AT 100° C. | | | | | |
| C | 3 | 490 | 2,040 | 4,590 | 870 |
| C | 10 | 530 | 2,120 | 4,690 | 855 |
| C | 20 | 400 | 1,880 | 4,600 | 845 |
| CURED IN AIR AT 82° C. | | | | | |
| C | 5 | 340 | 1,310 | 2,600 | 830 |
| C | 20 | 530 | 1,940 | 4,000 | 860 |
| C | 40 | 570 | 2,140 | 5,250 | 885 |
| CURED IN AIR AT 50° C. | | | | | |
| C | 10 | 580 | 2,080 | 4,150 | 860 |
| C | 20 | 430 | 1,640 | 3,660 | 870 |
| C | 30 | 530 | 1,890 | 4,340 | 875 |

The above data show the accelerating properties of the preferred class of materials and more particularly show a rapid acceleration at 100° C. and in addition show active acceleration at even lower temperatures. Thus, it is evident that desirable modulus and tensile properties are obtainable by curing in air at temperatures as low as 50° C.

Further typical examples of the preferred class of accelerators may be prepared in a manner analogous to that described in Example I or by other suitable means. Further examples of the new accelerators comprise N,N dimethyl cyclohexylamino dibutyl dithiocarbamate; N,N dimethyl cyclohexylamino diamyl dithiocarbamate; N,N dimethyl cyclohexylamino diethyl dithiocarbamate; N,N dimethyl cyclohexylamino dipropyl dithiocarbamate; N,N dimethyl cyclohexylamino cyclopentamethylene dithiocarbamate; N,N dimethyl cyclohexylamino, N-ethyl cyclohexyl dithiocarbamate; N,N dimethyl cyclohexylamino, N-butyl cyclohexyl dithiocarbamate; N,N dimethyl cyclohexylamino, N-amyl cyclohexyl dithiocarbamate; N,N dimethyl cyclohexylamino, N-hexyl cyclohexyl dithiocarbamate; N,N dimethyl cyclohexylamino dicyclohexyl dithiocarbamate; N,N diethyl cyclohexylamino, dibutyl dithiocarbamate, N methyl, N ethyl cyclohexylamino diamyl dithiocarbamate and equivalents and analogues thereof.

As further examples of preferred embodiments of the invention rubber stocks were compounded comprising

|  | Stock | | | |
| --- | --- | --- | --- | --- |
|  | D | E | F | G |
|  | Parts by weight | Parts by weight | Parts by weight | Parts by weight |
| Rubber as 60% latex | 100 | 100 | 100 | 100 |
| Zinc oxide | 1 | 1 | 1 | 1 |
| Sulfur | 1.5 | 1.5 | 1.5 | 1.5 |
| N,N dimethyl cyclohexylamino dibutyl dithiocarbamate | 0.5 | | | |
| N,N dimethyl cyclohexylamino dimethyl dithiocarbamate | | 0.5 | | |
| N,N dimethyl cyclohexylamino cyclopentamethylene dithiocarbamate | | | 0.5 | |
| N,N dimethyl cyclohexylamino, N-hexyl cyclohexyl dithiocarbamate | | | | 0.5 |

The stocks so compounded were flowed on glass and the films so formed permitted to dry after which they were cured as shown and the desirable modulus and tensile properties obtained upon testing the cured rubber products are set forth below.

*Table III*

| Stock | Cure time in minutes | Modulus of elasticity in lbs./in.² at elongations of— | | Tensile at break in lbs./in.² | Ult. elong., percent |
| --- | --- | --- | --- | --- | --- |
|  |  | 500% | 700% |  |  |
| CURED IN WATER AT 100° C. | | | | | |
| D | 3 | 260 | 1,020 | 3,290 | 920 |
| E | 3 | 330 | 1,320 | 4,550 | 950 |
| F | 3 | 320 | 1,560 | 4,760 | 920 |
| G | 3 | 410 | 1,640 | 4,470 | 915 |
| D | 5 | 240 | 970 | 3,370 | 925 |
| E | 5 | 280 | 1,100 | 4,000 | 950 |
| F | 5 | 310 | 1,470 | 4,800 | 920 |
| G | 5 | 440 | 1,700 | 4,730 | 920 |
| D | 10 | 260 | 1,090 | 3,530 | 905 |
| E | 10 | 290 | 1,200 | 4,190 | 950 |
| F | 10 | 330 | 1,650 | 4,540 | 885 |
| G | 10 | 420 | 1,790 | 4,540 | 910 |
| D | 20 | 300 | 1,360 | 3,750 | 880 |
| E | 20 | 300 | 1,180 | 4,000 | 920 |
| F | 20 | 360 | 1,870 | 4,590 | 855 |
| G | 20 | 460 | 2,020 | 4,730 | 885 |
| CURED IN AIR AT 82° C. | | | | | |
| D | 5 | 240 | 830 | 2,790 | 975 |
| E | 5 | 330 | 1,290 | 4,440 | 970 |
| F | 5 | 510 | 1,940 | 5,200 | 925 |
| G | 5 | 440 | 1,610 | 4,130 | 900 |
| D | 20 | 330 | 1,260 | 3,920 | 920 |
| E | 20 | 490 | 1,860 | 5,360 | 945 |
| F | 20 | 460 | 1,840 | 5,320 | 935 |
| G | 20 | 390 | 1,840 | 4,100 | 895 |
| D | 30 | 370 | 1,520 | 4,710 | 930 |
| E | 30 | 480 | 1,910 | 5,780 | 960 |
| F | 30 | 560 | 2,230 | 5,760 | 930 |
| G | 30 | 470 | 1,910 | 4,300 | 880 |
| D | 90 | 360 | 2,150 | 5,390 | 910 |
| E | 90 | 500 | 2,150 | 5,840 | 930 |
| F | 90 | 600 | 2,470 | 5,700 | 895 |
| G | 90 | 460 | 1,930 | 4,260 | 865 |

The above data show that the preferred class of accelerators give good fast cures at temperatures as low as 82° C. and that highly desirable modulus and tensile properties are obtained by employing the preferred materials as accelerators of vulcanization.

Further advantages not apparent from the above data were also observed. Thus, the improved accelerators did not exhibit undesirable effects on the latex such as thickening and showed no discoloration either of the vulcanizable latex or the cured rubber products.

As further specific embodiments of the present invention rubber stocks were compounded comprising

|  | Stock | | | | |
| --- | --- | --- | --- | --- | --- |
|  | H | J | K | L | M |
|  | Parts by weight | Parts by weight | Parts by weight | Parts by weight | Parts by weight |
| Rubber as 60% latex | 100 | 100 | 100 | 100 | 100 |
| Zinc oxide | 1 | 1 | 1 | 1 | 1 |
| Sulfur | 1.5 | 1.5 | 1.5 | 1.5 | 1.5 |
| Mineral acid treated 2,4 trimethyl dihydro quinoline | 1.0 | 1.0 | 1.0 | 1.0 | 1.0 |
| N,N dimethyl cyclohexylamino N-amyl cyclohexyl dithiocarbamate | 0.5 | | | | |
| N,N dimethyl cyclohexylamino diamyl dithiocarbamate | | 0.5 | | | |
| N,N dimethyl cyclohexylamino diethyl dithiocarbamate | | | 0.5 | | |
| N,N dimethyl cyclohexylamino dipropyl dithiocarbamate | | | | 0.5 | |
| N,N dimethyl cyclohexylamino N-ethyl cyclohexyl dithiocarbamate | | | | | 0.5 |

The stocks so compounded were flowed on glass and the films so formed dried and cured. The following data set forth the physical properties obtained on testing the cured rubber products.

*Table IV*

| Stock | Cure time in minutes | Modulus of elasticity in lbs./in.² at elongations of— | | Tensile at break in lbs./in.² | Ult. elong., percent |
| --- | --- | --- | --- | --- | --- |
|  |  | 500% | 700% |  |  |
| CURED IN WATER AT 100° C. | | | | | |
| H | 5 | 270 | 970 | 3,530 | 935 |
| J | 5 | 350 | 1,480 | 4,350 | 910 |
| K | 5 | 780 | 2,920 | 5,200 | 830 |
| L | 5 | 620 | 2,550 | 4,810 | 825 |
| M | 5 | 490 | 1,810 | 3,900 | 865 |
| H | 10 | 280 | 1,050 | 3,610 | 930 |
| J | 10 | 370 | 1,590 | 4,470 | 910 |
| K | 10 | 770 | 3,080 | 5,080 | 820 |
| L | 10 | 570 | 2,600 | 5,110 | 835 |
| M | 10 | 510 | 1,930 | 3,950 | 850 |
| H | 20 | 250 | 1,120 | 3,420 | 910 |
| J | 20 | 360 | 1,710 | 4,220 | 880 |
| K | 20 | 740 | 3,020 | 5,360 | 820 |
| L | 20 | 560 | 2,620 | 5,270 | 860 |
| M | 20 | 560 | 2,070 | 4,160 | 855 |
| H | 40 | 280 | 1,270 | 3,730 | 910 |
| J | 40 | 450 | 1,890 | 4,550 | 865 |
| K | 30 | 790 | 3,170 | 5,050 | 830 |
| L | 30 | 620 | 2,670 | 5,020 | 830 |
| M | 30 | 540 | 2,120 | 4,070 | 840 |
| H | 60 | 320 | 1,390 | 3,750 | 895 |
| J | 60 | 410 | 1,930 | 4,970 | 885 |
| K | 60 | 840 | 3,250 | 5,040 | 810 |
| L | 60 | 590 | 2,570 | 4,910 | 840 |
| M | 60 | 570 | 2,190 | 3,450 | 800 |
| CURED IN AIR AT 82°C. | | | | | |
| H | 10 | 370 | 1,200 | 3,050 | 930 |
| J | 10 | 380 | 1,630 | 4,210 | 925 |
| K | 10 | 710 | 2,520 | 5,540 | 895 |
| L | 10 | 670 | 2,690 | 5,210 | 850 |
| M | 10 | 440 | 1,600 | 3,710 | 890 |
| H | 30 | 210 | 1,030 | 2,820 | 900 |
| J | 30 | 360 | 1,620 | 3,270 | 850 |
| K | 30 | 720 | 2,650 | 5,100 | 845 |
| L | 30 | 730 | 2,840 | 5,380 | 860 |
| M | 30 | 450 | 1,680 | 3,630 | 870 |
| H | 60 | 320 | 1,390 | 3,590 | 920 |
| J | 60 | 450 | 1,820 | 4,000 | 865 |
| K | 60 | 700 | 2,670 | 5,000 | 840 |
| L | 60 | 660 | 2,930 | 5,260 | 835 |
| M | 60 | 490 | 1,750 | 3,780 | 870 |
| H | 90 | 220 | 1,220 | 3,900 | 925 |
| J | 90 | 500 | 2,030 | 4,710 | 895 |
| K | 90 | 750 | 2,850 | 5,050 | 830 |
| L | 90 | 660 | 2,710 | 4,820 | 820 |
| M | 90 | 470 | 1,730 | 3,420 | 850 |

The above data show the desirable modulus and tensile properties obtained by the use of the preferred class of accelerators. They are shown to give relatively flat cures in addition to being active at low temperatures.

As a further specific embodiment of the invention showing the use of the preferred accelerators with an accelerator of a different class a rubber stock was compounded comprising Stock N, parts by weight

| | |
|---|---|
| Rubber as 60% latex | 100 |
| Zinc oxide | 2 |
| Sulfur | 1.25 |
| Mineral acid treated 2,2,4 trimethyl dihydroquinoline | 1.0 |
| Di(benzothiazyl thiol) dimethyl urea | 0.5 |
| N,N dimethyl cyclohexylamino dicyclohexyl dithiocarbamate | 0.5 |

The mix so compounded was flowed on glass and the films so formed were dried and cured in water at 100° C. The modulus and tensile properties obtained on testing the cured rubber products are given below.

*Table V*

| Stock | Stock time in minutes | Modulus of elasticity in lbs./in.² at elongations of— | | Tensile at break in lbs./in.² | Ult. elong., percent |
|---|---|---|---|---|---|
| | | 500% | 700% | | |
| N | 5 | 90 | 170 | 580 | 1,020 |
| N | 10 | 120 | 260 | 810 | 910 |
| N | 20 | 290 | 1,160 | 2,910 | 870 |
| N | 40 | 300 | 1,570 | 3,980 | 870 |

The above data show that the preferred class of compounds may be employed in conjunction with thiazole accelerators as activators thereof with resultant highly desirable modulus and tensile properties.

Again, the foregoing examples are intended to be illustrative of the invention and not a limitation thereof. Other vulcanized products may be obtained by employing other compounding ingredients and other proportions of ingredients than those particularly set forth in the examples given. The invention is limited solely by the following claims.

What is claimed is:

1. The process of vulcanizing rubber which comprises heating rubber and sulfur in the presence of an N,N dialkyl cyclohexylamine salt of a dialkyl dithiocarbamic acid.

2. The process of vulcanizing rubber which comprises heating rubber and sulfur in the presence of an N,N diamethyl cyclohexylamine salt of a dialkyl dithiocarbamic acid.

3. The process of vulcanizing rubber which comprises heating rubber and sulfur in the presence of N,N dimethyl cyclohexylamino dibutyl dithiocarbamate.

4. The process of vulcanizing rubber which comprises heating rubber and sulfur in the presence of N,N dimethyl cyclehexylamino diamyl dithiocarbamate.

5. A vulcanizable rubber composition containing as a vulcanization accelerator an N,N dialkyl cyclohexylamine salt of a dialkyl dithiocarbamic acid.

6. A vulcanizable rubber composition containing as a vulcanization accelerator an N,N dimethyl cyclohexylamine salt of a dialkyl dithiocarbamic acid.

7. A vulcanizable rubber composition containing as a vulcanization accelerator N,N dimethyl cyclohexylamino dibutyl dithiocarbamate.

8. A vulcanizable rubber composition containing as a vulcanization accelerator N,N dimethyl cyclohexylamino diamyl dithiocarbamate.

9. In the process of vulcanizing the rubber in latex the step which comprises mixing the latex with vulcanizing materials and an N,N dialkyl cyclohexylamine salt of a dialkyl dithiocarbamic acid.

10. In the process of vulcanizing the rubber in latex the step which comprises mixing the latex with vulcanizing materials and an N,N dimethyl cyclohexylamine salt of a dialkyl dithiocarbamic acid.

DAVID J. BEAVER.